US010066962B2

(12) United States Patent
Svoboda et al.

(10) Patent No.: US 10,066,962 B2
(45) Date of Patent: Sep. 4, 2018

(54) APPARATUS, SYSTEM, AND METHOD FOR SENSOR AUTHENTICATION

(71) Applicant: Battelle Energy Alliance, LLC, Idaho Falls, ID (US)

(72) Inventors: John M. Svoboda, Idaho Falls, ID (US); Mark J. Schanfein, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1125 days.

(21) Appl. No.: 13/932,873

(22) Filed: Jul. 1, 2013

(65) Prior Publication Data

US 2015/0006115 A1    Jan. 1, 2015

(51) Int. Cl.
    *G06F 7/00*      (2006.01)
    *G01D 3/08*      (2006.01)

(52) U.S. Cl.
    CPC ..................... *G01D 3/08* (2013.01)

(58) Field of Classification Search
    USPC ..................... 701/29.4, 29.9, 31.1
    See application file for complete search history.

(56) References Cited

U.S. PATENT DOCUMENTS

| 4,122,432 A * | 10/1978 | Triebold ................. G01H 3/08 367/135 |
| 6,741,919 B1 | 5/2004 | Schuster et al. |
| 6,934,650 B2 | 8/2005 | Yoshida et al. |
| 8,389,941 B2 | 3/2013 | Bendahan et al. |
| 2008/0033695 A1* | 2/2008 | Sahara ................. G01H 1/003 702/185 |

OTHER PUBLICATIONS

Evans et al., "Flow Rate Measurements Using Flow-Induced Pipe Vibration," Transactions of the ASME, vol. 126, (Mar. 2004) pp. 280-285.
International Search Report for International Application No. PCT/US2014/044141 dated Oct. 27, 2014, 3 pages.
International Written Opinion of International Application No. PCT/US2014/044141 dated Oct. 27, 2014, 6 pages.
Svoboda et al., "Transducer Signal Noise Analysis for Sensor Authentication" No. INL/CON-12-24524. Idaho National Laboratory, Jul. 2012.

* cited by examiner

*Primary Examiner* — Lam Nguyen
(74) *Attorney, Agent, or Firm* — TraskBritt

(57) ABSTRACT

A method includes receiving an output signal from a sensor, recovering a noise signal from the output signal, comparing the noise signal with a stored baseline noise signature, and reporting authentication of the sensor if the comparison is within a pre-determined error limit. A sensor authentication apparatus, comprises a processor and a memory operably coupled with the processor. Instructions, when executed, cause the processor to separate a noise signal from a measured signal, and detect a noise signature match by comparing the noise signal with at least one stored baseline noise signature associated with the sensor. A sensor authentication system comprises a sensor authentication unit and a data acquisition unit. At least one of the sensor authentication unit and the data acquisition unit is configured to compare a noise signal with a baseline noise signature to authenticate the at least one sensor from among a plurality of sensors.

23 Claims, 7 Drawing Sheets

APPARATUS, SYSTEM, AND METHOD FOR SENSOR AUTHENTICATION

GOVERNMENT RIGHTS

This invention was made with government support under Contract Number DE-AC07-05ID14517 awarded by the United States Department of Energy. The government has certain rights in the invention.

FIELD

Embodiments of the present disclosure are directed to the field of radiation sensors and, more particularly, to sensor authentication and detection of sensor tampering at nuclear facilities.

BACKGROUND

The International Atomic Energy Agency (IAEA) is a United Nations science and technology-based organization that both assists and inspects its member states, in the context of planning for and using nuclear science and technology for various peaceful purposes. Since the 1980s, the IAEA has deployed unattended and remote monitoring systems to allow for state of the art automated monitoring of nuclear facilities to ensure that member states comply with their nuclear safeguards commitments. This remote monitoring supplemented and strengthened onsite inspections to ensure nuclear materials were not diverted for weaponization or other unknown non-peaceful purposes.

Remote monitoring systems are permanently installed in a nuclear facility and are expected to be robust and reliable continuously for periods of approximately 10-15 years or more. At the same time, the IAEA must assure itself that the data collected are authentic. A layered approach has been used to both deter and detect intentional tampering by member states. Both hardware and software have been employed, including secure sealed housings for system components and sensors, tamper-indicating conduits, digital encryption and authentication, and data analysis for tamper anomalies. While the information-gathering components are locked in secure cabinets, the radiation sensor components (e.g., neutron and gamma detectors) are in secure housings, but they are located throughout the plant and use cabling to provide power and collect data over long distances. In some cases, there are kilometers of cabling in cable trays as well as cables running through wall penetrations. The detection of sensor tampering in high radiation areas is particularly challenging due to the high probability of single event upsets and component burnout on integrated circuits normally used to digitize and authenticate sensor signals. As a result, the inventors have appreciated that improved methods and apparatuses for sensor authentication and tampering detection may be desired.

DETAILED DESCRIPTION

Figure 1:
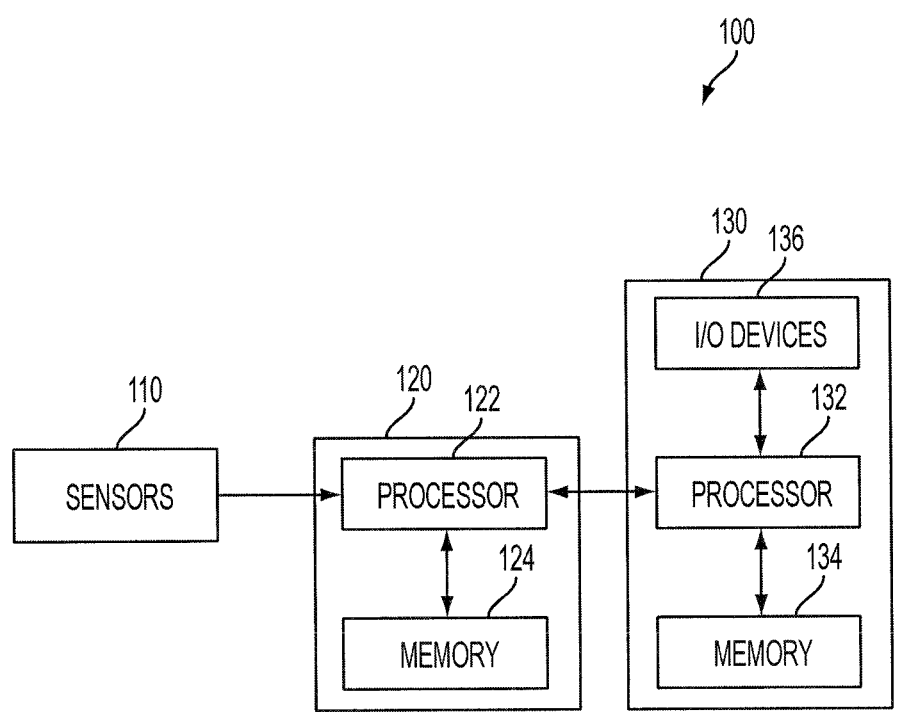
FIG. 1 is a schematic block diagram of a sensor authentication system according to an embodiment of the present disclosure.

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the invention. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present invention is defined only by the appended claims.

In the following description, elements, circuits, and functions may be shown in block diagram farm in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as, for example a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

The term "electrical noise" (also referred to herein as "noise") may include any electrical energy that is not desired to be superimposed on a measured signal (i.e., electrical energy) of interest in an electrical system. Generally, electrical noise interferes with the ability to accurately measure a signal. Electrical noise may be generated by many sources. For example, electrical noise may include thermal noise, shot noise, flicker noise, system-induced noise, vibrational noise, and other types of noise. Thermal noise may be generated by thermal motion acting on charge carriers. Shot noise may be generated by random fluctuations of discrete current charges. Flicker noise may be known by its one-over frequency relationship. System-induced noise may be generated by internal oscillators. Vibrational noise may be generated by vibrations acting on system components, such as cabling (e.g., microphonics). Electromagnetic noise may be generated by sources internal and external to the facility, such as, for example, AC motor drives and local radio stations.

Terms such as the signal-to-noise ratio are commonly used to provide a numerical measure that describes the level of useful information (e.g., measured signal) as compared to the level of non-useful information (e.g., noise). System designers may design functions that reduce the noise level in order to increase the signal-to-noise ratio. For embodiments of this disclosure, the level of the measured signal is less significant—rather, it is the noise that contains the information used herein.

Embodiments of the present disclosure relate to methods and apparatuses for sensor authentication and tampering detection. In particular, embodiments of the present disclosure may analyze the noise signatures to distinguish between sensors among a group of sensors, and further to determine whether the currently measured signal may be associated with the sensor that was originally installed. In other words, the noise generated by the sensor may be used as a measure of the signal validity from a sensor-tampering point of view.

Tampering may occur by through sensor replacement or with another completely different device under another's control. The methods may authenticate a sensor and detect tampering by analyzing a noise signal between a radiation sensor and a data acquisition system. An apparatus may be configured to perform a sensor authentication function by examining the spectral content of a sensor's output noise signal after the measured signal is removed. The spectral content from the noise signal may be obtained to generate a noise signature that is compared with prior noise signature data for a group of sensors to determine and/or identify an individual sensor from among a set of sensors. In addition, the apparatus and method may be used to determine whether the sensors have been tampered with. For convenience of discussion, examples are provided herein that describe embodiments of the disclosure as they relate to radiation sensors and nuclear detection and monitoring. Embodiments should not be viewed as so limited, and it is contemplated that embodiments of the disclosure may include application to fields beyond even nuclear material detection. Exemplary organizations that may be interested in protecting valuable assets beyond using sensor authentication methods described herein may include DOD, DOE, DHS, private sector entities, as well as other foreign entities.

FIG. 1 is a schematic block diagram of a sensor authentication system 100 according to an embodiment of the present disclosure. Sensor authentication system 100 includes one or more sensors 110, a sensor authentication unit 120, and a data acquisition unit 130. The sensors 110, the sensor authentication unit 120, and the data acquisition unit 130 are operably coupled such that the output signal (e.g., measured signal and noise) from the sensors 110 is received by the sensor authentication unit 120, which reports authentication information to the data acquisition unit 130.

In conventional nuclear material detection systems, the sensors 110 may transmit the measured signal to the data acquisition unit 130 directly, which may be configured to determine information such as neutron or gamma count rates. In embodiments of the present disclosure, however, during authentication the output signal may be received by the sensor authentication unit 120, which may be configured to separate the noise from the measured signal for further analysis and sensor authentication. The authentication results may be reported to the data acquisition unit 130 identifying the noise profile and probabilities for a match for each sensor 110 being monitored, which may aid an inspector in determining if sensor tampering has taken place since the last inspection visit. In embodiments of the present disclosure, the sensor authentication unit 120 may be in parallel with the data acquisition unit 130. In other words, FIG. 1 is to be understood as showing a path for the sensor signal to be received by the sensor authentication circuit, but is not to be understood as the only path for the sensor signal to travel. For example, the sensors 110 may still be coupled directly to the data acquisition unit 130 such that the measured signal may be transmitted to the data acquisition unit for analysis thereof irrespective of the analysis performed by the sensor authentication unit 120.

The sensors 110 may be configured to detect the presence of nuclear materials, such as those materials that emit neutrons and gamma rays. The sensor authentication system 100 may include different types of sensors 110. For example, the sensor authentication system 100 may include one or more neutron sensors and one or more gamma sensors. Other sensor types (e.g., flow, pressure, etc.) are also contemplated as would be understood by those of ordinary skill in the art. The sensors 110 may be remotely located from the sensor authentication unit 120 and the data acquisition unit 130, such as at remote locations having materials exhibiting high levels of radiation. Thus, the sensor authentication unit 120 and the data acquisition unit 130 may not need to be hardened against the adverse effects of radiation due to their remote location from the nuclear materials.

The sensor authentication unit 120 may include a processor 122 operably coupled with a memory device 124. The memory 124 may store data (e.g., noise signatures) during set up as well as during real-time use. The memory 124 also may have instructions (e.g., software code) stored thereon for instructing the processor 122 to perform the analysis of the noise signatures associated with the different sensors 110. Although the processor 122 and the memory 124 are shown separately, the memory 124 and the processor 122 may be integrated into a single device (e.g., the software may be stored in memory embedded within the processor 122). In addition, the processor 122 may have its own memory for the software code instructions executed by the processor 122 and then a separate memory 124 that is used for data storage.

The data acquisition unit 130 may also include a processor 132, a memory 134, and input/output (I/O) devices 136. Users may operate the data acquisition unit 130 to operate the sensor authentication system 100. In addition, the users may view the results generated by the sensor authentication unit 120 and the results for actual detection of the nuclear materials. I/O devices 136 may include a keyboard, a mouse, an electronic display, a touch screen display, a printer, and other similar I/O devices and computer peripherals. The data acquisition unit 130 may include a computing device, such as a desktop computer, a lap top computer, a tablet computer, a smart phone device, or other similar computing device.

Although the sensor authentication unit 120 and the data acquisition unit 130 are shown separately, they may be integrated into a single device. For example, the data acquisition unit 130 and the sensor authentication unit 120 may be integrated within a single device (e.g., a "bench top" version of the apparatus). In such an embodiment, the functions of each of the sensor authentication unit 120 and the data acquisition unit 130 may be performed via the same computing device having the same processor running a custom application to perform all functions of the sensor authentication system 100.

It is also contemplated that the sensor authentication unit 120 and the data acquisition unit 130 may be configured as separate devices, each having its own processors and memory. Thus, the sensor authentication unit 120 may include a relatively small, low power electronic device coupled at an interface between the sensors 110 and existing data acquisition units 130. The sensor authentication unit 120 may be configured to monitor unique signal noise characteristics and record deviations from those unique signal noise characteristics that are considered normal for each sensor 110. These deviations may be recorded and presented to the inspectors during their normal facility data review activities. In such an embodiment, there may be little modification other than a relatively simple connection to the signal line at the computational end of the sensor signal line when retrofitting (i.e., incorporating a sensor authentication unit 120 within) existing systems that already have sensors 110 or data acquisition units 130.

The sensor authentication unit 120 may be configured to filter out sensor pulses from the measured signal to reveal just the noise signal of the output signal. The noise signal may be on the order of a few millivolts. The noise signal may be filtered again to limit the noise bandwidth. The remaining noise signal may be amplified and again filtered to limit noise due to amplification and prevent anti-aliasing. This noise signal may then be digitized at a relatively high rate to preserve the complete noise spectra, and converted from time to high resolution frequency domain. Noise spectra may be accumulated over periods of time (e.g., as an average noise over a period) at the installation after the sensor 110 is installed in the working environment. The resulting spectrum may have removed unwanted spectral components while maintaining a unique subset of desired spectral components, which may be recorded and is used as a baseline noise signature for a given sensor for future comparisons. During operation, sensor noise is constantly compared to the baseline noise signature. The comparison may be used to calculate a probability of spectral match. These probabilities may be recorded and presented to the inspector during data review. Deviations from an expected probability are used to determine if tampering (e.g., sensor replacement, insertion of dummy signals, etc.) has occurred. This information could lead to an expanded investigation and prevent attempts to divert nuclear material.

Figure 2:
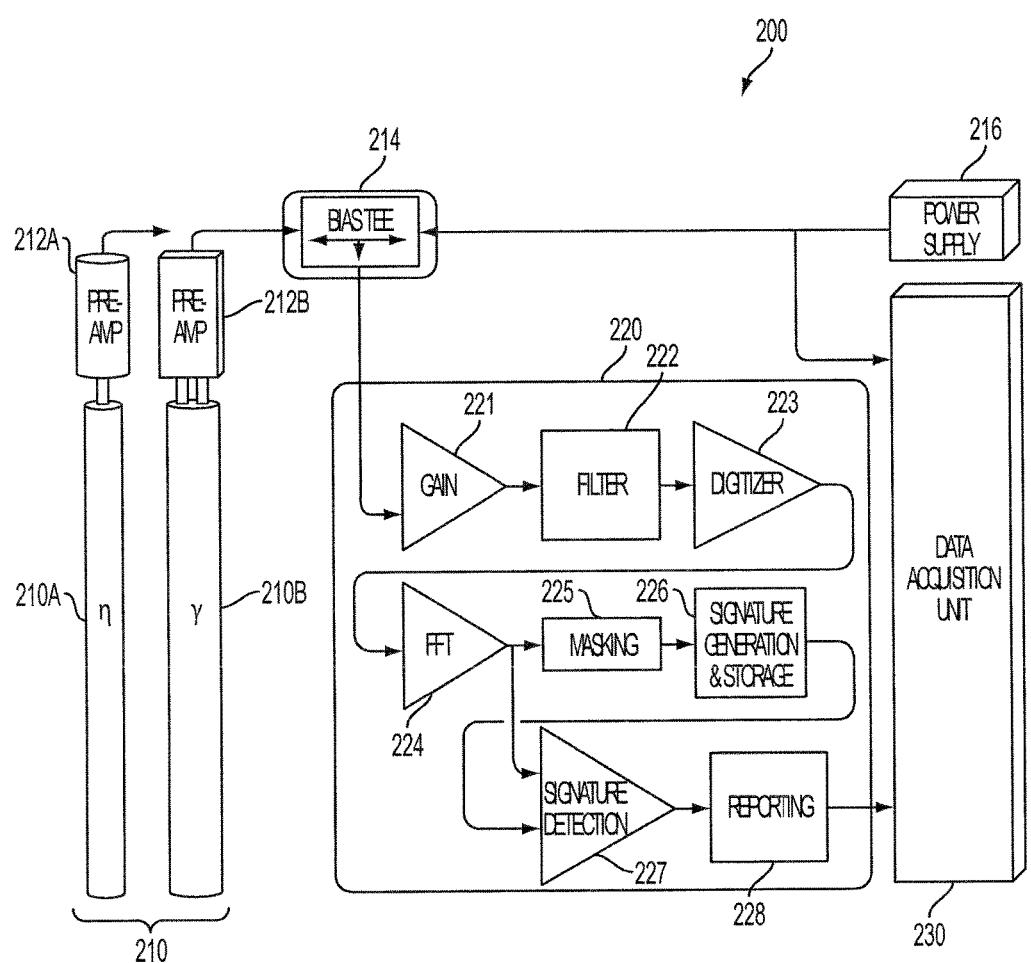
FIG. 2 is a schematic block diagram of a sensor authentication system according an embodiment of the present disclosure.

FIG. 2 is a schematic block diagram of a sensor authentication system 200 according an embodiment of the present disclosure. The sensor authentication system 200 includes one or more sensors 210 operably coupled with a sensor authentication unit 220 and a data acquisition unit 230. The sensors 210 may include different types of sensors, such as one or more neutron sensors 210A and one or more gamma sensors 210B. The sensors 210A, 210B may be coupled with the sensor authentication system 200 through pre-amplifiers 212A, 212B and a bias tee 214 that also receives power from a power supply 216.

As discussed above with respect to FIG. 1, the sensor authentication unit 220 and the data acquisition unit 230 may be integrated within the same device, may be separate devices, or certain functions may be combined in separate devices differently than specifically shown in the figures. As an example, the sensor authentication unit 220 may include a relatively small electronics device coupled at an interface of the sensors 210 and a data acquisition unit 230. A coaxial cable may deliver pre-amplified signals to the bias tee 214 connector at the end of the cable. One port of the bias tee 214 may couple with the sensor authentication unit 220, and the other ports may maintain signal integrity to a rate counter. Information (e.g., spectral content) may be communicated from the sensor authentication unit 220 to the data acquisition unit 230 through various communication interfaces (e.g., wired, wireless, etc.). In one embodiment, the sensor authentication unit 220 and the data acquisition unit 230 may be connected via a universal serial bus (USB) connection.

The sensor authentication unit 220 may include a plurality of processing elements configured to generate and evaluate noise signatures of the sensors 210, such as a gain 221, a filter 222, a digitizer 223, a Fast Fourier Transform (FFT) 224, masking 225, signature generation and storage 226, signature detection 227, and reporting 228. One or more of these elements may be implemented in software and executed by a processor (e.g., processor 122 of FIG. 1) of the sensor authentication unit 220. Thus, these elements shown in FIG. 2 may be understood as a software block diagram. These functional elements may be performed within the sensor authentication unit 220, the data acquisition unit 230, or a combination thereof.

The output signal may be received by the sensor authentication unit 220, and the time domain noise may be amplified by a predetermined gain factor. The predetermined gain factor may be programmable (e.g., from 1×, 10×, 100×, and 1000×) to amplify the noise components to be within the dynamic range of the digitizer 223. The time domain noise may be filtered by the filter 222 to remove the gamma/neutron events and any frequency components that may cause the signal to become aliased by the digitizer 223. The filter 222 may be a low pass filter (e.g., four pole Butterworth filter) that may pass relatively low frequencies (e.g., 200 kHz and below) while filtering out relatively high frequencies (e.g., above 200 kHz). The left-over signal (i.e., noise signal) may then be digitized by the digitizer 223 (e.g., ADC), such as, for example, up to 1 MHz in order to record an appropriate amount of high resolution time domain data sufficient to compute the frequency spectra. The noise signal may be converted from the time domain to the frequency domain, such as by using the FFT 224. As an example only, the FFT may be a 4096 point FFT that results in a 2048 point frequency spectrum. The spectral resolution may be on the order of 30 Hz for an integrated system and 60 Hz for a sensor authentication unit 220 configured as a separate device. Different resolutions (e.g., higher resolutions) are contemplated and may be desirable.

During initial set up (e.g., calibration) of the sensor authentication system 200, the noise signatures for each of the sensors 210A, 210B may be generated and stored. The sensors 210 may be coupled initially individually to generate a noise signature for that individual sensor. During this set up phase, the sensor's noise signature may be averaged together over time to remove random noise and reveal the underlying structure of the sensor's broadband frequency domain signature. After each sensor 210A, 210B has had its baseline noise signature generated, the baseline noise signatures may be stored by the sensor authentication unit 220 as an array of noise signatures that each represent one of the plurality of sensors 210 that are part of the sensor authentication system 200.

With the baseline noise signatures being stored, the sensors 210 may be coupled with the sensor authentication unit 220 for monitoring during actual use. During actual use, the real-time noise signatures may be generated in a manner similar to that previously described, such as by removing the sensor signal from the noise, amplification of the noise signal, filtering, digitization, conversion to the frequency domain, and averaging performed on each sensor's signal noise. The resulting real-time noise signatures may be multiplied by a mask 225 with the same number of frequency bins as the FFT 224. The mask 225 may cause a removal of frequency spectra that is known to be not related to the sensors 210A, 210B through other baseline measurements performed on the system 200 without the sensors 210 connected. The unrelated spectra may be due to any number of unrelated external sources of noise coupled into the system, such as electrical magnetic interference. In some situations, these external sources of noise may be also valuable in validating each sensor and its configuration within the facility.

During sensor authentication, the generated noise signature may be unknown as to which sensor 210A, 210B it is associated with, and whether or not the sensor has been tampered with. To determine which sensor 210A, 210B from among the set of all sensors generated the noise signature, the real-time noise signature may be compared to the array of known baseline noise signatures that have already been stored in the sensor authentication unit 220. The comparison may be performed by calculating spectral component differences, summing the differences to obtain a result, perform a fit (e.g., sliding offset and span expansion/compression) against the signature and obtain additional results, compare results against thresholds (e.g., the lowest result wins), and examine differences in trends against historical differences over time. The sliding offset may be performed with a cross correlation function. The span expansion/compression may be performed by slightly spreading and compressing the spectral lines using the same number of spectral lines and then rechecking the fit against the signature set.

Again, these known baseline noise signatures were generated previously using the same sensors 210. As a result, individual sensors may be identified through the stored noise signal data. In addition, deviations from expected probabilities of a match may be used to determine if tampering, sensor replacement, or insertion of dummy signals has occurred. As discussed above, the various signal processing functions may be performed in one of the sensor authentication unit 220 and the data acquisition unit 230. For example, the data acquisition unit 230 may perform the signature detection function 227 after receiving the noise signatures from the sensor authentication unit 220. The signature detection function 227 may, however, be performed within the sensor authentication unit 220 (as is shown in FIG. 2), which may relieve the data acquisition unit 230 from tasks other than simply recording the signature detection error over time.

As a result, embodiments of the present disclosure include apparatuses and methods to identify an individual sensor 210A, 210B from among a set of sensors 210 by a unique noise signature generated by each sensor 210A, 210B. The sensors 210 may be of the same model and manufacturer or a completely different model and manufacturer. For example, a plurality of neutron sensors may be used that are of the same make and model as each other. In addition, a plurality of gamma sensors may also be used that are of same make and model as each other. Sensors 210 of the same make and model may have noise signatures that are relatively similar, which may cause unique sensor identification to be more difficult; however, even such similar sensors may generate noise signatures that include unique characteristics that are detectable by the sensor authentication unit 220. The sensor authentication unit 220 may also include a correlation function to determine the drift of the main part of the spectral component group during analysis as an input for future decisions.

The sensor authentication unit 220 may be configured to authenticate one or more sensors at a time. In some embodiments, a single sensor may be coupled to the sensor authentication unit 220 to determine if the sensor is one of the original sensors of the group, which sensor it is, and if the sensor or sensor signal has been tampered with. In some embodiments, the sensor authentication unit 220 may include a plurality of inputs that may receive a plurality of output signals simultaneously from different sensors. As a result, a plurality of sensors may be authenticated simultaneously through independent channels, and the gain and filtering may also be independently set for each channel.

In some embodiments, a real-time noise signature may be compared against a single baseline noise signature to determine if it is within acceptable error limits without comparing against a set of noise signatures from a plurality of different sensors. For example, only a single sensor may be present, or in some embodiments, a plurality of sensors may be present; however, the sensor identity may be known and therefore, comparison against the entire set of noise signatures may not be necessary.

Figure 3A:
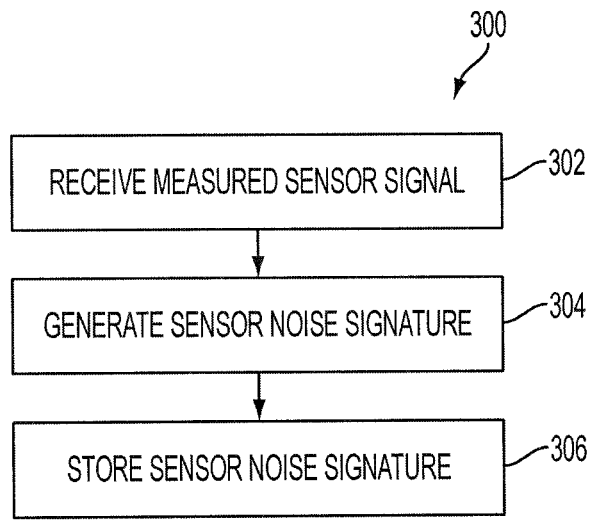
FIG. 3A is a flowchart illustrating a method for generating a baseline noise signature according to an embodiment of the present disclosure.

FIG. 3A is a flowchart 300 illustrating a method for generating a baseline noise signature according to an embodiment of the present disclosure. At operation 302, an output signal is received from a sensor. The output signal may include a measured signal and a noise signal. At operation 304, the sensor noise signature is generated. The sensor noise signature may be generated by amplification by a predetermined gain factor (e.g., 100+) to be within the dynamic range of the digitizer, filtering the noise signal to separate from the measured signal and remove any frequency components that may cause the signal to become aliased by the digitizer, digitizing the time domain signal, and converting the noise signal to the frequency domain. The sensor's noise signatures may be averaged together over time to remove random noise and reveal the underlying structure of the sensor's broadband frequency domain signature. At operation 306, the generated noise signature may be stored. Operations 302-306 may be repeated for each sensor operably coupled to the sensor authentication system 100, with each noise signature may be stored in an array of signatures respectively associable with each of the plurality of sensors.

Figure 3B:
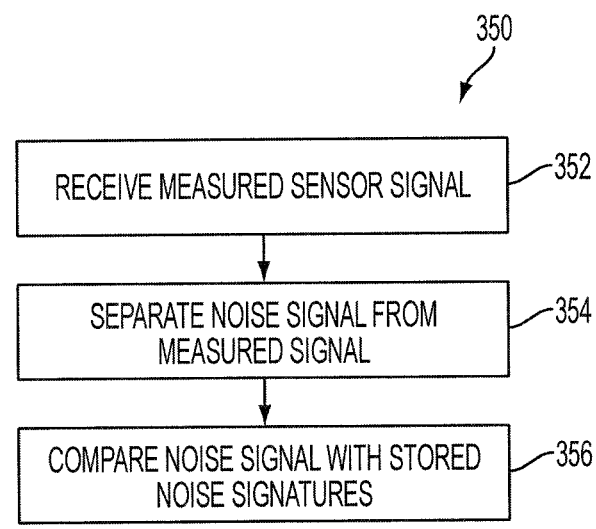
FIG. 3B is a flowchart illustrating a method of authenticating a sensor according to an embodiment of the present disclosure.

FIG. 3B is a flowchart 350 illustrating a method of authenticating a sensor according to an embodiment of the present disclosure. At operation 352, an output signal is received from one or more sensors. The output signal may include a measured signal and a noise signal. At operation 354, the noise signal is separated (i.e., recovered) from the measured signal. At operation 356, the noise signal is compared with the stored baseline noise signatures that were collected earlier with the same sensors included within the sensor authentication system 100. The set of data that yields the lowest error rates during the comparison may be used to identify which of the individual sensors generated the noise signal from among the group of sensors, and if there has been any tampering with respect to that sensor. In other words, deviations from expected probabilities of a match may be used to determine if tampering (e.g., sensor replacement, insertion of dummy signals, etc.) has occurred.

Figure 4:
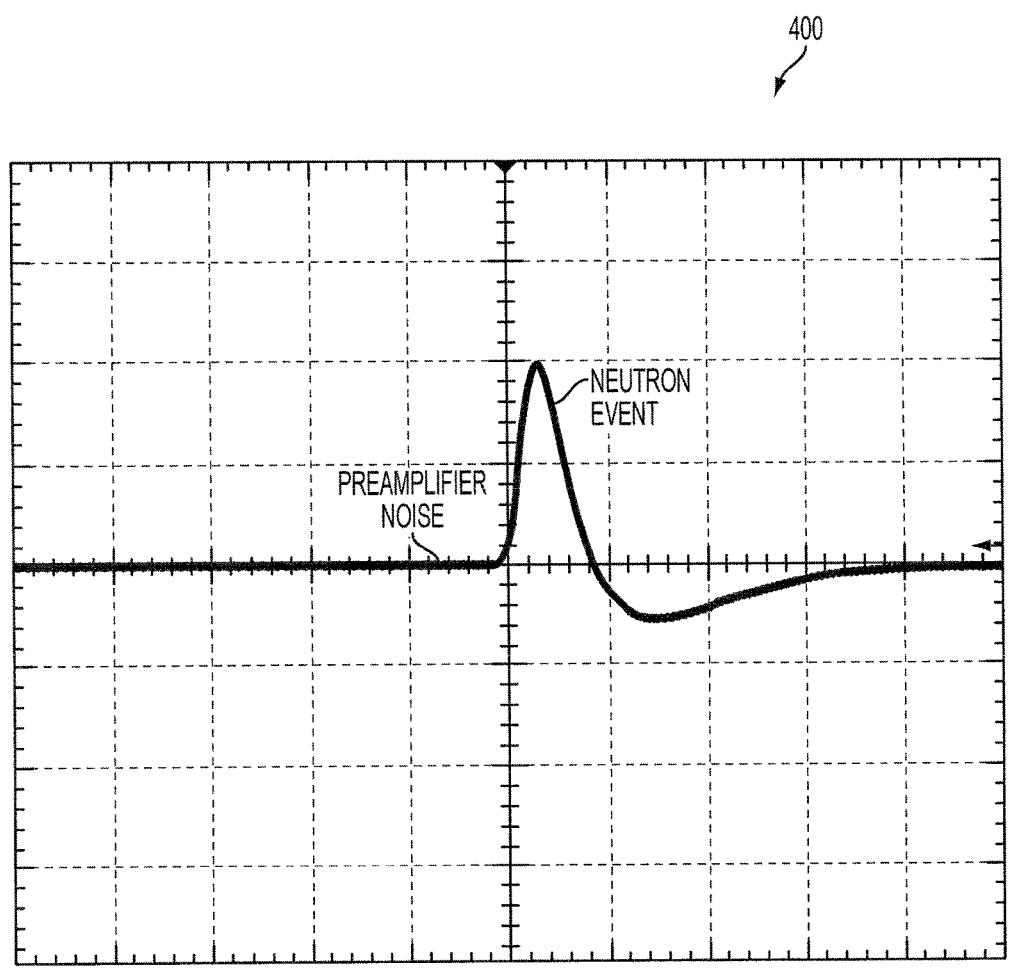
FIG. 4 is a plot showing a measured signal from a neutron sensor due to a single neutron event.

FIG. 4 is a plot 400 showing a measured signal from a neutron sensor due to a single neutron event. This measured signal is about 1-volt in amplitude on top of the 12-Vdc preamplifier power. The pulse width of the measured signal is about 1 microsecond in duration. The neutron event signal may be removed from the output signal wire by filtering, which may reveal just the noise signal that is part of the output signal. The filtered noise signal may be delivered to the sensor authentication unit 120, 220 (FIGS. 1 and 2) for further analysis and sensor authentication.

Figure 5:
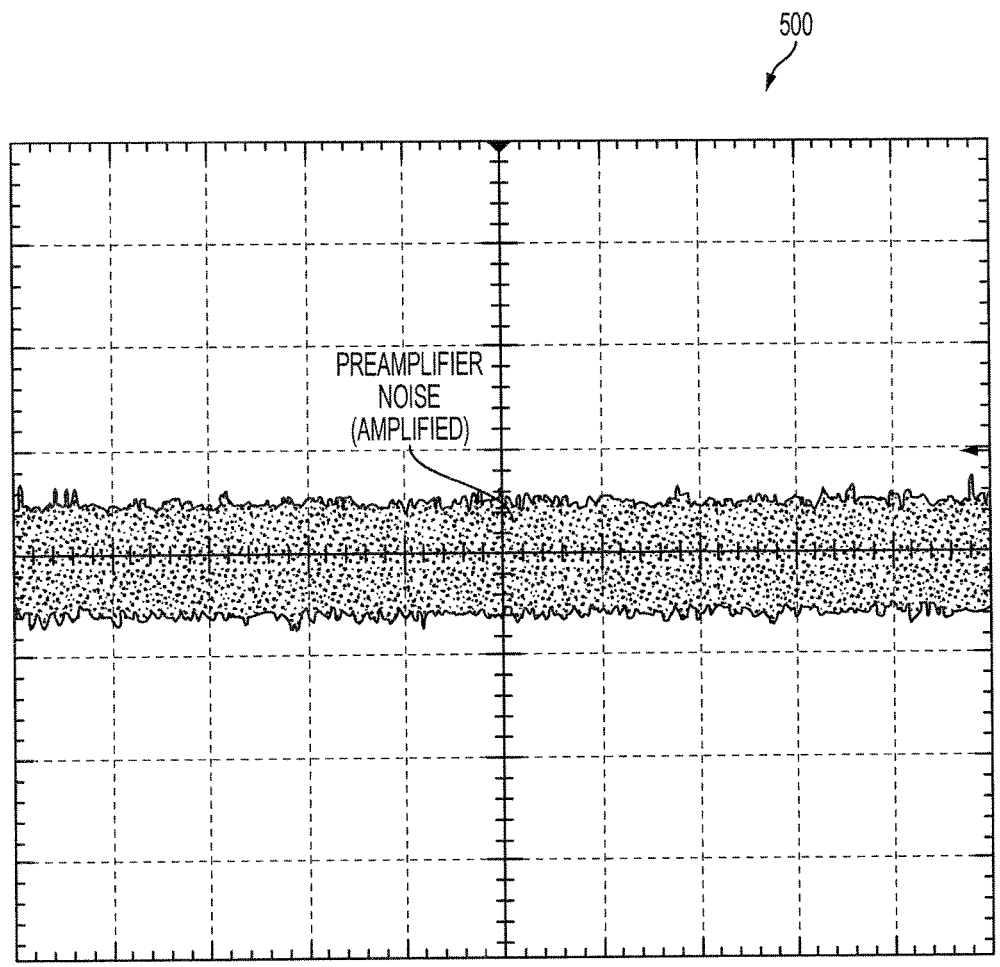
FIG. 5 is a plot showing the noise signal with the neutron signal removed.

FIG. 5 is a plot 500 showing the noise signal with the neutron event signal removed. The level of the noise signal is about ±5 mV, which is about 1/200th the amplitude of the neutron signal and 1/2400th the amplitude of the 12 Vdc power signal. On the surface, the noise may appear to be similar to random white noise. However, after application of the FFT, the true spectral content of the noise signal may be revealed.

Figure 6:
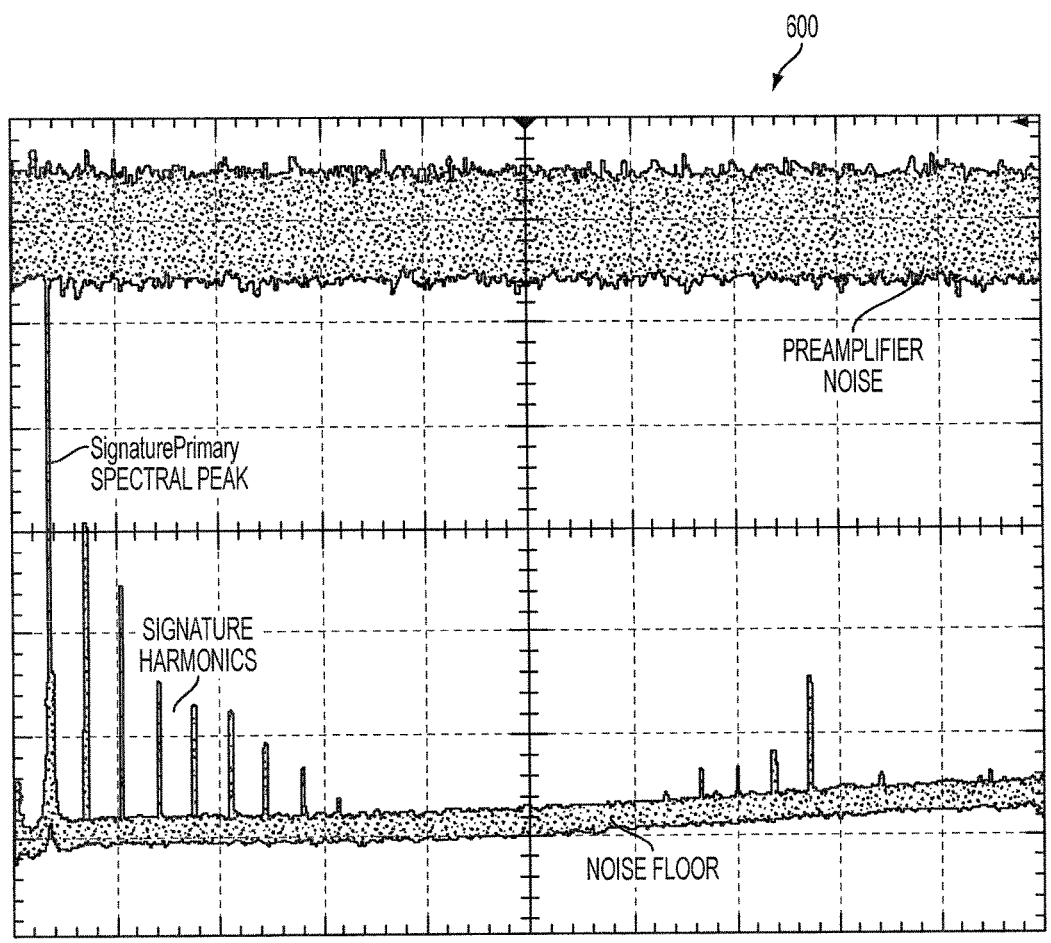
FIG. 6 is a plot showing the time domain noise signal and the spectral content of that noise signal both superimposed onto the same figure.

FIG. 6 is a plot 600 showing the time domain noise signal and the spectral content of that noise signal both superimposed onto the same figure. The entire noise floor components are analyzed for spectral content after the measured signal (e.g., radiation event) is filtered out. It is this spectral content that includes the information from which the noise signatures are derived. The spectrum includes information on the noise floor vs. frequency, spectral peak locations, peak widths, amplitudes, and harmonics. The collected spectrum of the noise signal may be a relatively high resolution spectrum that, in some embodiments, extends from DC to several hundred kHz just below the AM broadcast band with resolution of in the range of tens of Hz. The noise signal may also include noise components from local electromagnetic field generating components both inside the facility where the sensors are located as well as noise components external to the facility.

Figure 7:
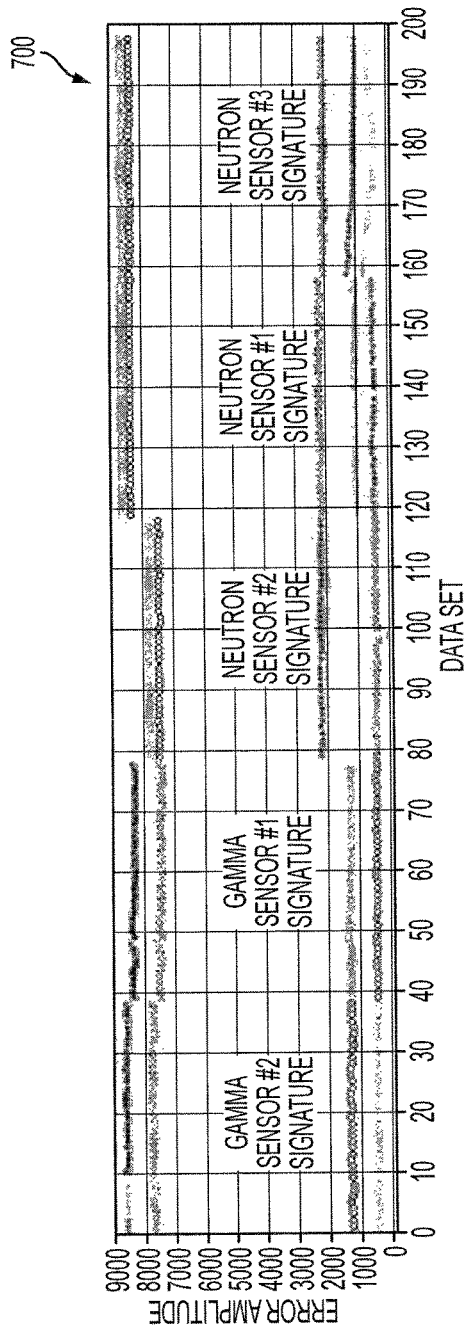
FIG. 7 is a plot that compares five noise signatures collected earlier with the same sensors and now used as the unknowns.

FIG. 7 is a plot 700 that compares five noise signatures collected earlier with the same sensors (e.g., from two gamma and three neutron sensors) and that are later used as the unknowns as an exemplary demonstration. As discussed above, the three neutron sensors may be of the same manufacturer and model number as each other. Likewise, the two gamma sensors may be of the same manufacturer and model number as each other. The y-axis is the signature to the unknown sensor error. The sensor noise signature that yields the signature error with the lowest value equates to the most likely match. The sensor noise signature with the greatest error is the least likely match. The x-axis shows five groups of 39 signature to sensor comparison data sets for a total of 195 x-axis entries. Each data set represents the error collected for each of the five neutron/gamma sensor combinations over a relatively long period of time.

The first group of 39 represents the Gamma Sensor #2 Signature as compared to the five sensor combinations. As a result of the comparison, it may be determined that Gamma Sensor #2 is the most likely sensor having generated that noise signal with Neutron Sensor #1 being the least likely sensor having generated that noise signal. The second group of 39 (40 to 78) represents the Gamma Sensor #1 Signature as compared to the five sensor combinations. As a result of the comparison, it may be determined that Gamma Sensor #1 is the most likely sensor with Neutron Sensor #1 being the least likely sensor. The third, fourth, and fifth groups (i.e., the Neutron Sensor #2, Neutron Sensor #1, and Neutron Sensor #3 signatures) as compared to all five sensors also choose proper sensors (i.e., the Neutron Sensor #2, Neutron Sensor #1, and Neutron Sensor #3) as the most likely.

Figure 8:
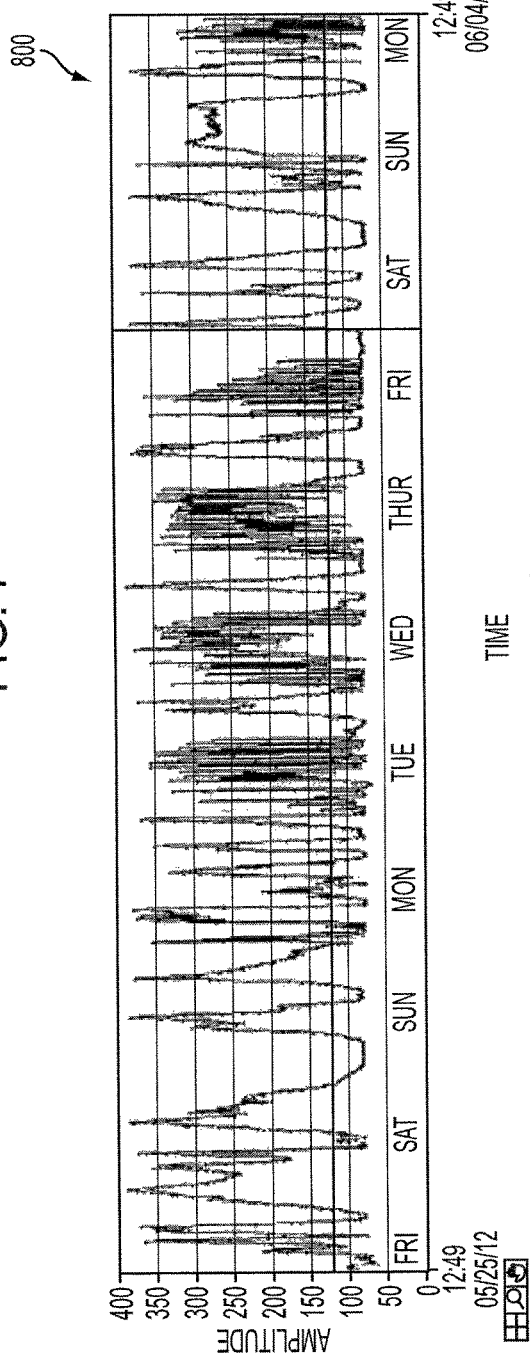
FIG. 8 is a highly expanded plot of one of the noise signature error plots of FIG. 7.

FIG. 8 is a highly expanded plot 800 (Y axis) of one of the signature error plots (e.g., Neutron Sensor #2) of FIG. 7 taken over the course of ten days in May and June 2012 in a controlled laboratory environment. In particular, FIG. 8 is a long time period plot showing how the error plot follows building temperature heating and ventilation cycles. The plot of building temperature is not shown in FIG. 8.

At first glance, one may assume that the signatures are time varying. A time varying signature, however, may not be desirable for a sensor authentication system. Upon closer examination, however, one may notice that the signature error followed the building heating and ventilation cycles over this same period. FIG. 8 indicates that the sensor signature may be temperature sensitive. A temperature-sensitive noise signature is not necessarily an undesirable side effect. The information may be of great value as long as the information is understood. For example, the information may be used by the on-site inspector to correlate with records of building activities during the inspection period. For example, the data recorded in FIG. 8 covers the period between May 25 and June 4, which also includes the Memorial Day weekend holidays. The text in FIG. 8 (Monday through Sunday) identifies the day of the week when the noise signature analysis data was recorded. The vertical line between each day identifies the time of 12:00 midnight for each day.

The first Saturday, Sunday, and Monday are the Memorial Day weekend holiday. The heating and ventilation system was in a setback mode with a minimal heat load as is evidenced by the slow changing error signature for those three days. However, beginning Tuesday morning when people return to work, the rapidly changing error signature signifies this status change, which starts around 8:00 AM and continues through about 7:00 PM, when the building becomes empty again. On Tuesday evening, when the heat load goes back to a minimum, the sensors indicate this status change until Wednesday morning when the building becomes occupied again and the heat load increases. This pattern continues through Friday afternoon when the building empties for the weekend. The signature error returns throughout the day to the same baseline minimum recorded when the signature was originally taken. An inspector may use the baseline signature error minimums and the associated signature error deviations correlated against building activities to determine if the sensor is the same sensor that was originally installed, as well as if false signal noise data has been introduced.

As a result of the above-described apparatuses and methods, sensors may be identified from among a group of sensors, sensor tampering may also be detected that could potentially disguise the diversion of nuclear material in a facility in violation of its commitments. In addition, sensor validation and/or degradation may also be identified as an added benefit. For example, noise characteristics may be monitored over time and not just in comparison to the initial baseline noise signatures generated for each sensor. Because sensor noise is a function of all noise sources (e.g., external as well as internal), changes in the noise characteristics over time may also act as an indicator of signal degradation, as a precursor to failure, or as an indication of configuration change. Thus, the baseline noise signatures may be updated over time and a history may be monitored to identify trends in the changes of the noise signatures even if the differences do not rise to the level of tampering. Thus, differences in trends of the noise signal may be detected against historical differences over time, such as detecting existence of variations in the trends caused by environmental effects (e.g., temperature). Noise characteristics may also be successfully correlated with measured signal level, which may also result to further analysis and relevant information related to a signal authentication method.

CONCLUSION

Embodiments of the present disclosure include a method for authenticating a sensor. The method comprises receiving an output signal from a sensor, recovering a noise signal from the output signal, comparing the noise signal with at least one stored baseline noise signature, and reporting authentication of the sensor if the comparison is within a pre-determined error limit.

Another embodiment includes a sensor authentication apparatus, comprising a processor, and a memory operably coupled with the processor, and having instructions stored thereon that, when executed, cause the processor to separate a noise signal from a measured signal from a sensor, and detect a noise signature match by comparing the noise signal with at least one stored baseline noise signature associated with the sensor.

Another embodiment includes a sensor authentication system, comprising a sensor authentication unit configured to receive an output signal from at least one sensor and generate a noise signal from the output signal. The system further comprises a data acquisition unit having an electronic display to be read by a user. At least one of the sensor authentication unit and the data acquisition unit is configured to compare the noise signal with at least one baseline noise signature to authenticate at least one sensor from among a plurality of sensors.

While the disclosure is susceptible to various modifications and implementation in alternative forms, specific embodiments have been shown by way of examples in the drawings and have been described in detail herein. However, it should be understood that the invention is not intended to be limited to the particular forms disclosed. Rather, the invention includes all modifications, equivalents, and alternatives falling within the scope of the following appended claims and their legal equivalents.

What is claimed is:

1. A method of authenticating a sensor, the method comprising:
   receiving an output signal from a sensor;
   recovering a noise signal from the output signal;
   generating a noise signature by obtaining spectral content of the noise signal;
   comparing the spectral content from the noise signature with spectral content from at least one stored baseline noise signature generated previously by the same sensor; and
   reporting authentication of the sensor if a result of the comparison is a spectral match within a pre-determined error limit.

2. The method of claim 1, wherein recovering a noise signal includes filtering the noise signal from the measured signal of the output signal.

3. The method of claim 2, wherein the measured signal includes at least one of a gamma and a neutron event measurement.

4. The method of claim 1, wherein recovering the noise signal includes amplifying the noise signal by a pre-determined gain factor.

5. The method of claim 1, wherein recovering the noise signal includes digitizing the noise signal.

6. The method of claim 5, wherein obtaining the spectral content of the noise signal includes applying a Fast Fourier Transform to the digitized noise signal.

7. The method of claim 1, wherein comparing the spectral content from the noise signature with the spectral content from at least one stored baseline noise signature includes comparing the spectral content from the noise signature with spectral content from a plurality of stored baseline noise signatures each associated with a plurality of different sensors of a sensor authentication system.

8. The method of claim 1, wherein the receiving, the generating, the comparing, and the reporting are performed for a plurality of different sensors at least substantially concurrently with each other.

9. The method of claim 1, wherein comparing the spectral content from noise signal with the spectral content from the at least one stored baseline noise signature includes calculating spectral component differences, summing the component differences, performing a fit against the signature and obtain results, and comparing the results against thresholds.

10. The method of claim 9, wherein performing a fit includes at least one of:
using a cross correlation function to perform a sliding offset; and
performing span expansion and compression by spreading and compressing the spectral lines using the same number of spectral lines and then rechecking the fit against the signature set.

11. The method of claim 9, further comprising detecting differences in trends of the noise signal against historical differences over time.

12. The method of claim 11, wherein detecting differences in trends of the noise signal against historical differences over time includes detecting existence of environmental effects in the trends.

13. A sensor authentication apparatus, comprising:
a processor; and
a memory operably coupled with the processor, and having instructions stored thereon that, when executed, cause the processor to:
separate a noise signal from a measured signal from a sensor; and
detect probability of a noise signature spectral match by comparing spectral content of the noise signal with spectral content of at least one stored baseline noise signature associated with the same sensor to authenticate the sensor.

14. The sensor authentication apparatus of claim 13, further comprising a sensor authentication unit that comprises the processor and the memory.

15. The sensor authentication apparatus of claim 13, wherein the instructions further cause the processor to report tampering of the sensor if the spectral content of the noise signature does not match spectral content of any of the baseline noise signatures stored in the memory within a predetermined degree of probability.

16. The sensor authentication apparatus of claim 15, wherein tampering of the sensor includes at least one of a replacement of the original sensor and a dummy signal being transmitted to the sensor authentication apparatus.

17. The sensor authentication apparatus of claim 13, wherein the instructions further cause the processor to generate and store a plurality of baseline noise signatures associated with a plurality of sensors.

18. The sensor authentication apparatus of claim 15, wherein the plurality of baseline noise signatures is an average value for a plurality of data points received for a given sensor.

19. A sensor authentication system, comprising:
a sensor authentication unit configured to:
receive an output signal from at least one sensor; and
generate a noise signal from the output signal; and
a data acquisition unit having an electronic display output,
wherein at least one of the sensor authentication unit and the data acquisition unit is configured to compare spectral content of the noise signal with spectral content of at least one baseline noise signature to authenticate the at least one sensor from among a plurality of sensors based on a spectral match within a pre-determined error limit.

20. The sensor authentication system of claim 19, wherein the sensor authentication unit and the data acquisition unit are integrated within a single device.

21. The sensor authentication system of claim 19, wherein the sensor authentication unit and the data acquisition unit are separate devices coupled through a communication connection.

22. The sensor authentication system of claim 19, wherein the at least one sensor includes a plurality of radiation sensors that include at least one gamma sensor and at least one neutron sensor.

23. The sensor authentication system of claim 19, further comprising a computing device that includes at least the data acquisition unit, wherein the computing device is selected from the group consisting of a desktop computer, a laptop computer, a tablet computer, and a smart phone.

* * * * *

UNITED STATES PATENT AND TRADEMARK OFFICE
CERTIFICATE OF CORRECTION

PATENT NO. : 10,066,962 B2
APPLICATION NO. : 13/932873
DATED : September 4, 2018
INVENTOR(S) : John M. Svoboda and Mark J. Schanfein Page 1 of 1

It is certified that error appears in the above-identified patent and that said Letters Patent is hereby corrected as shown below:

In the Specification
Column 2, Line 38, change "diagram farm in" to --diagram form in--

Signed and Sealed this
Second Day of October, 2018

Andrei Iancu
*Director of the United States Patent and Trademark Office*